(12) United States Patent
Hattig

(10) Patent No.: US 7,187,661 B2
(45) Date of Patent: Mar. 6, 2007

(54) GATHERING OF DEVICE DISCOVERY INFORMATION

(75) Inventor: Myron Hattig, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 10/914,718

(22) Filed: Aug. 9, 2004

(65) Prior Publication Data

US 2005/0102453 A1    May 12, 2005

Related U.S. Application Data

(63) Continuation of application No. 09/336,792, filed on Jun. 21, 1999, now Pat. No. 6,775,244.

(51) Int. Cl.
*H04L 12/28* (2006.01)

(52) U.S. Cl. ............ 370/257; 710/104; 713/310

(58) Field of Classification Search ............ None
See application file for complete search history.

(56) References Cited

U.S. PATENT DOCUMENTS

| 5,546,540 | A |   | 8/1996  | White |
|-----------|---|---|---------|-------|
| 5,657,221 | A |   | 8/1997  | Warman et al. |
| 5,764,930 | A |   | 6/1998  | Staats |
| 5,915,119 | A | * | 6/1999  | Cone ............... 713/310 |
| 5,991,842 | A |   | 11/1999 | Takayama |
| 6,148,241 | A |   | 11/2000 | Ludtke et al. |
| 6,160,796 | A | * | 12/2000 | Zou ............... 370/257 |
| 6,182,094 | B1| * | 1/2001  | Humpleman et al. ....... 715/513 |
| 6,195,366 | B1|   | 2/2001  | Kayashima et al. |
| 6,198,479 | B1|   | 3/2001  | Humpleman et al. |
| 6,202,211 | B1|   | 3/2001  | William, Jr. |
| 6,775,244 | B1| * | 8/2004  | Hattig ............... 370/257 |

FOREIGN PATENT DOCUMENTS

| EP | 0 455 402  | 11/1991 |
| EP | 0 854 605  | 7/1998  |
| EP | 0 874 498  | 10/1998 |
| WO | WO 99/14945| 3/1999  |

OTHER PUBLICATIONS

PCT International Search Report, Dec. 29, 2000, 7 pp.

* cited by examiner

*Primary Examiner*—Chi Pham
*Assistant Examiner*—Phuc Tran
(74) *Attorney, Agent, or Firm*—Fish & Richardson P.C.

(57) ABSTRACT

A method is disclosed for use on a bus that supports broadcast discovery. According to the method, identification information is received from a device on the bus and discovery information is obtained from the device using the identification information. The discovery information is then broadcast on the bus.

18 Claims, 5 Drawing Sheets

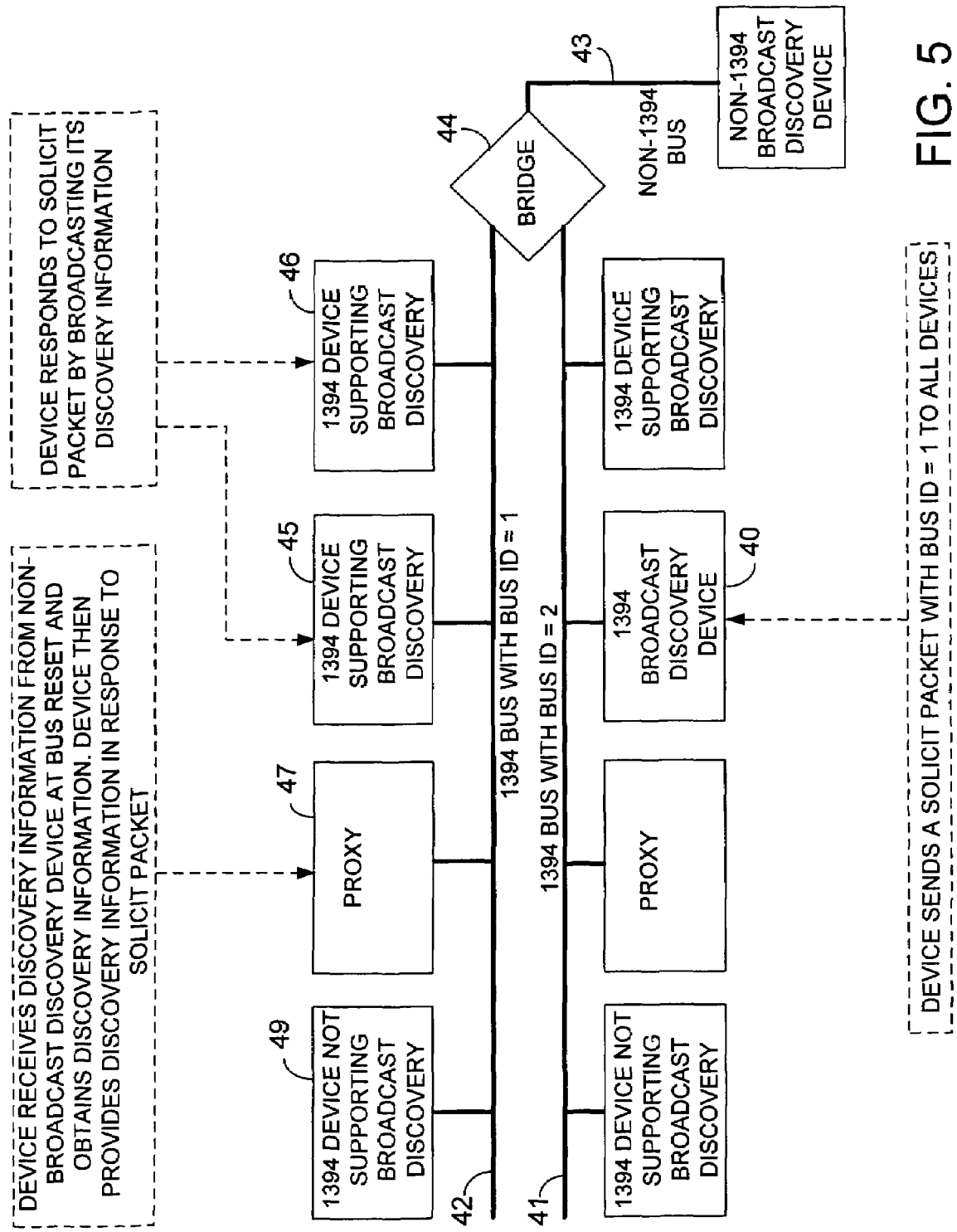

GATHERING OF DEVICE DISCOVERY INFORMATION

BACKGROUND OF THE INVENTION

This invention relates to gathering device discovery information.

Institute of Electrical and Electronics Engineers ("IEEE") standard 1394–1395 (published Jun. 16, 1995) defines a high-speed serial bus ("1394 bus") that can transfer data among consumer electronic devices, personal computers ("PCs"), and peripheral devices such as monitors, keyboards, printers, scanners.

When devices are added to and removed from an active 1394 bus, the bus will automatically reconfigure itself to accommodate the changes. To facilitate reconfiguration (and other interactions among the devices), each device stores discovery information comprised of a unique identifier and information identifying services available from the device. The information is useful to other devices in making use of the services.

SUMMARY OF THE INVENTION

In one embodiment, the invention is a method for use on a bus that supports broadcast discovery. According to the method, identification information is received from a device on the bus and discovery information is obtained from the device using the identification information. The discovery information is then broadcast on the bus.

BRIEF DESCRIPTION OF THE DRAWINGS

FIGS. 2 and 5 are block diagrams of a network according to one embodiment of the invention.

DESCRIPTION

A typical home network includes digital consumer electronic devices that exchange digital control data, audio streams, and video streams. Examples of such devices include PCs, digital camcorders, digital cameras, digital videocassette recorders ("VCRs"), digital televisions ("TVs"), and other processing devices.

Figure 1:
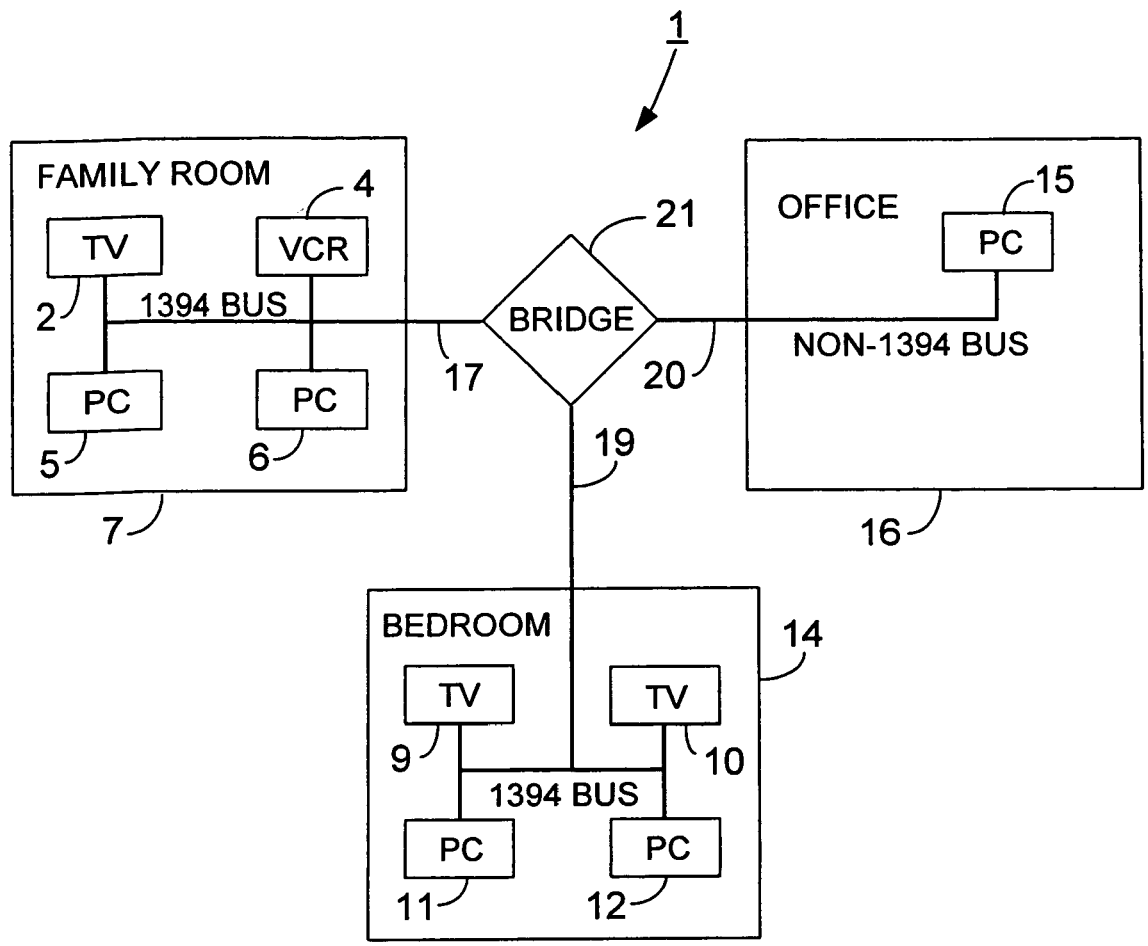
FIG. 1 is a block diagram of a home network according to one embodiment of the invention.

In FIG. 1, a representative home network 1 includes TV 2, VCR 4, PC 5, and PC 6 located in family room 7; TV 9, VCR 10, PC 11, and PC 12 located in bedroom 14; and PC 15 located in office 16. TV 2, VCR 4, PC 5, and PC 6 are coupled to 1394 bus 17; and TV 9, VCR 10, PC 11, and PC 12 are coupled to 1394 bus 19. These devices support IEEE 1394 and therefore have 1394 interfaces. PC 15 is coupled to non-1394 bus 20. Examples of non-1394 buses for a home networking environment are Home Phoneline Networking Alliance ("HomePNA"), Home Radio Frequency ("HomeRF"), and Ethernet. 1394 bus 17, 1394 bus 19, and non-1394 bus 20 are interconnected by bridge 21.

Each 1394 bus in a network includes a unique 1394 bus identifier ("bus ID"). The non-1394 bus may be integrated into network 1 by assigning the non-1394 bus a simulated 1394 bus ID. By configuring devices on the non-1394 bus similarly to those on the 1394 bus, it is possible to provide substantially the same capabilities to devices on the non-1394 bus as provided to devices on a 1394 bus. This includes storing and using 1394 configuration information as described below. Thus, even if PC 15 does not have a 1394 interface, PC 15 may interact with devices on 1394 buses 17 and 19, as described below.

A 1394 bus allows interactions between applications running on devices connected to the bus. For example, a user may be able to tell VCR 4 to pause a current video playing on TV 2 in family room 7, wait five minutes, and then resume playing the video on TV 9 in bedroom 14.

To communicate with and/or use another device, such as VCR 4, a PC must know the identity of the other device and the services available from that device. This information, and other information available from the other device, is called the device's "discovery information". Under the 1394 specification, a device's discovery information is stored in its configuration read-only memory ("ROM"). Devices like PCs that need to learn device discovery information for other devices on the network are called "discovery devices". Protocols exist for discovering information from devices on the network.

Learn Node ID Then Interrogate

In the "learn node ID then interrogate" protocol (as that phrase is used herein), resetting of a 1394 bus causes a hardware initialization which triggers each device on the bus to send a self-ID packet that includes the device's network node ID. Typically, a bus reset occurs when a device on the bus is turned on or off, added to or removed from the bus, or when application software running on one of the devices (e.g., PC 5) forces a bus reset, e.g., in response to a handling error.

In some implementations of the "learn node ID then interrogate" protocol, bus resets are forwarded to other buses on the network, e.g., from 1394 bus 17 to 1394 bus 19 and non-1394 bus 20, to obtain self-ID packets from devices on the other buses. A discovery device stores the node ID from each self-ID packet until the hardware initialization is done. Then, the discovery device interrogates other devices on the bus to obtain their discovery information.

Interrogation is done by an asynchronous read transaction addressed to the node ID stored for each device. Discovery information is then read from the configuration ROM of each device. The configuration ROM contains a root directory and zero or more unit directories. The root directory contains a globally unique device identifier called the EUI-64, and information about unit directories. The unit directories contain device service information, such as the type of the device (e.g., a PC, VCR, TV) and the functions of that device that are available over the network (e.g., "play", "fast-forward").

Broadcast Discovery

The second protocol, called "broadcast discovery", is an advertise and solicit protocol. Discovery of devices and services occurs during advertisements triggered, e.g., by a bus reset or a solicit packet.

Upon a bus reset, all devices connected to the bus broadcast advertise packets over a BROADCAST CHANNEL defined in the 1394 specification. Bridge 21 connects the BROADCAST CHANNELs of the 1394 buses and a corresponding mechanism on each non-1394 bus to enable advertise packets to be broadcast over the entire network.

An advertise packet contains device discovery information from the source device's configuration ROM, including the device services information. Discovery devices receive advertise packets and use the discovery information in the advertise packets to generate a list of devices connected to the bus and services available from those devices.

Broadcast discovery can also be used to update an existing list of devices and services. When either all or part of the discovery information is to be updated, the discovery device solicits the information by sending a solicit packet. The discovery device may issue a solicit packet, for example, upon failure to receive advertised discovery information due to a broadcast error, when the network topology changes without a corresponding bus reset, or when an application running on a device requests refreshed or new discovery information. Like advertise packets, solicit packets are broadcast on the BROADCAST CHANNEL of the 1394 bus and can span an entire 1394 network.

When complete re-discovery of all devices on a network is needed, a solicit packet can be broadcast from the discovery device to all devices on a network using a global bus ID. To discover devices connected to a specific bus, the solicit packet can specify a bus ID assigned to that bus. When devices on the network receive the solicit packet from a discovery device, they compare the ID of the bus to which they are connected with the bus ID in the solicit packet. If the two match, then the device responds to the solicit packet with the requested information, otherwise not. This works for both 1394 and non-1394 buses. A similar process can be used to obtain information from specific devices using specific device ID's.

Discovery Proxies

Discovery devices that use broadcast discovery expect to receive discovery information from other devices in response to a bus reset or solicit packet. However, legacy devices that support "learn node ID then interrogate" discovery may not also support broadcast discovery. Which discovery protocols a device uses depends upon software stored in its memory.

Thus, legacy devices may only provide their node ID in response to a bus reset. To permit legacy devices to participate in 1394 bus transactions, a proxy device may be connected to the network to gather discovery information from legacy devices using the "learn node ID then interrogate" protocol and then to broadcast the received discovery information in accordance with the broadcast discovery protocol to discovery devices that need the discovery information.

Figure 2:
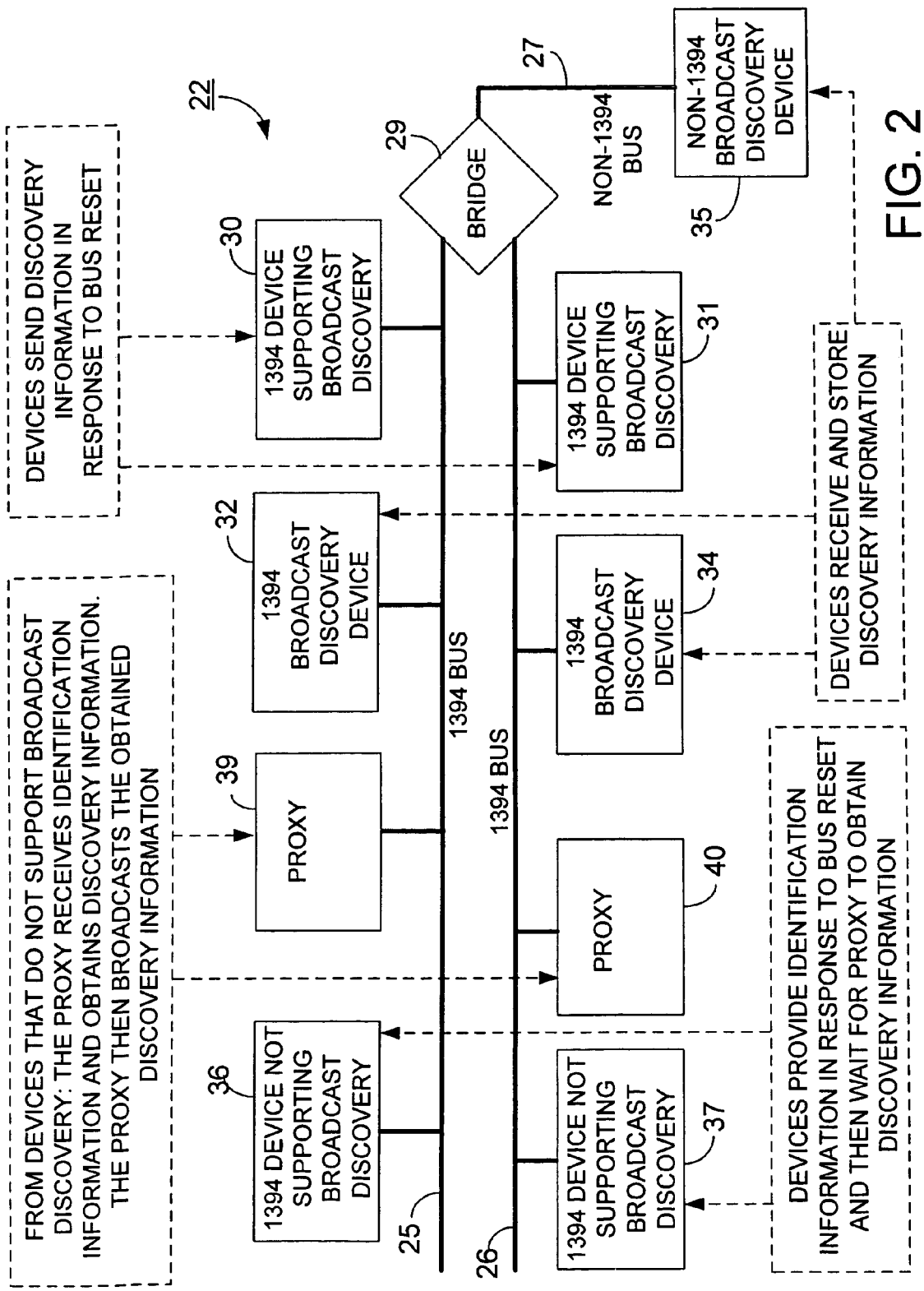

As seen in FIG. 2, a network 22 includes 1394 bus 25, 1394 bus 26, and non-1394 bus 27 connected by a bridge 29. 1394 devices 30 and 31, 1394 discovery devices 32 and 34, and non-1394 discovery device 35 all support broadcast discovery. 1394 devices 36 and 37 are legacy devices that do not support broadcast discovery but do support "learn node ID then interrogate" discovery. Proxies 39 and 40 obtain discovery information from the legacy devices and forward it to the discovery devices.

Proxies 39 and 40 can be any of the devices shown in FIG. 1 or any other type of network device. Code may be loaded into a memory on a device and then executed by the device's processor in order to cause the device to operate as a proxy. Each bus typically has only one proxy; however, more than one proxy may be included. Although FIG. 2 shows proxies as separate devices, "proxy code" could be loaded into, and executed on, devices that support broadcast discovery, those that do not support broadcast discovery, and non-1394 devices.

Using Broadcast Proxies to Obtain Discovery Information

Figure 3:
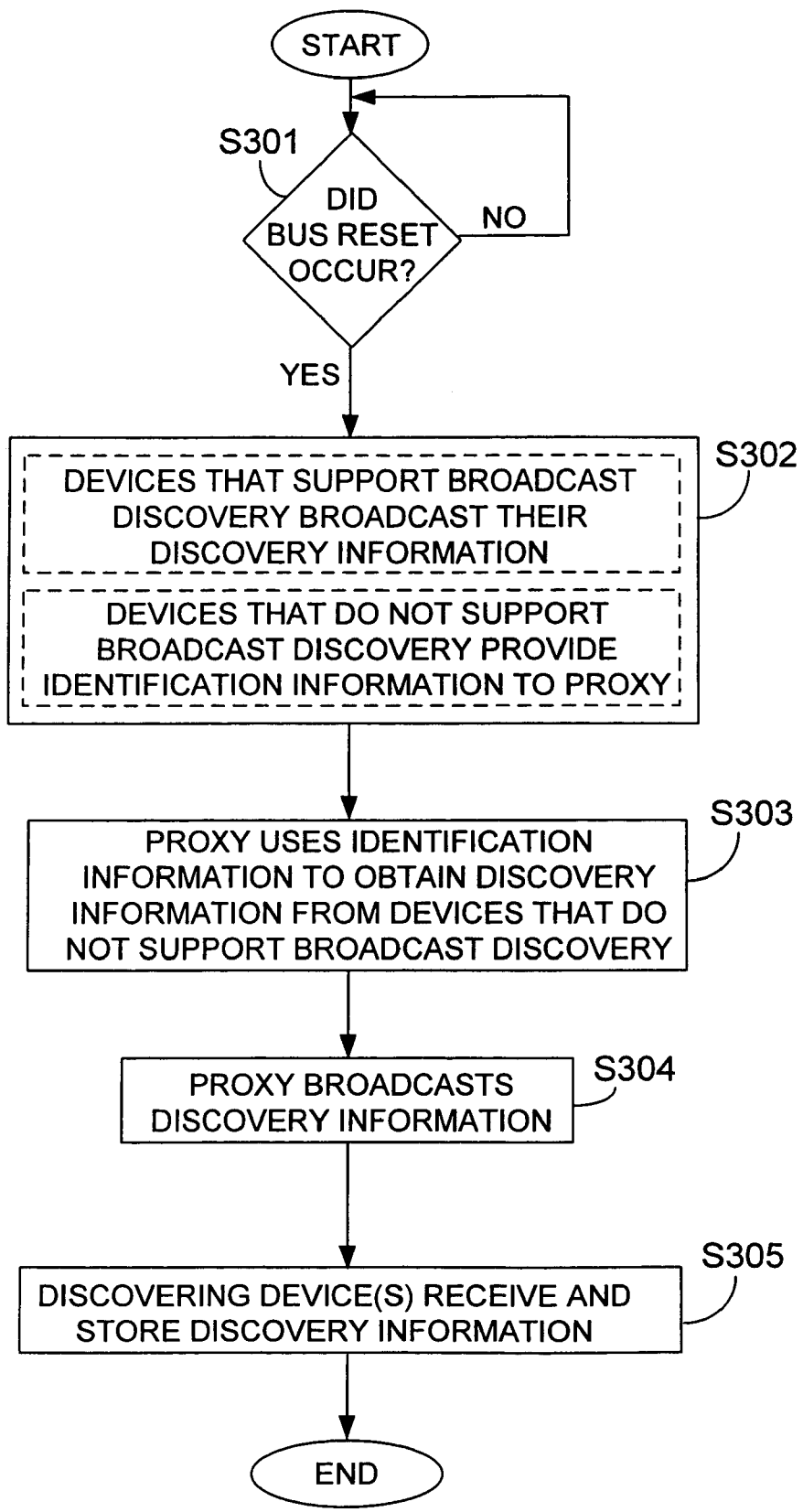
FIGS. 3 and 4 are flow diagrams for gathering broadcast discovery information according to one embodiment of the invention.

FIG. 3 shows a process for obtaining discovery information using broadcast proxies on bus 25. (An identical process applies for bus 26.) To begin, step S301 waits for a bus reset to occur. Upon a bus reset, devices that support broadcast discovery broadcast their discovery information. For example, device 30 broadcasts advertise packets containing its discovery information on bus 25. This discovery information is read and stored by discovery device 32.

Also, upon bus reset, legacy devices that do not support broadcast discovery send to their respective buses identification information that includes device node ID's and possibly other information. For example, device 36 sends its node ID to bus 25, and proxy 39 receives this node ID from bus 25. The other devices on bus 25 ignore this node ID.

In step S303, proxy 39 uses the identification information received from device 36 to obtain discovery information from that device using the "learn node ID then interrogate" protocol. Proxy 39 performs an asynchronous read operation on the configuration ROM of device 36 in order to obtain its globally-unique device identifier and service information. This information is stored in a memory on proxy 39.

Figure 4:
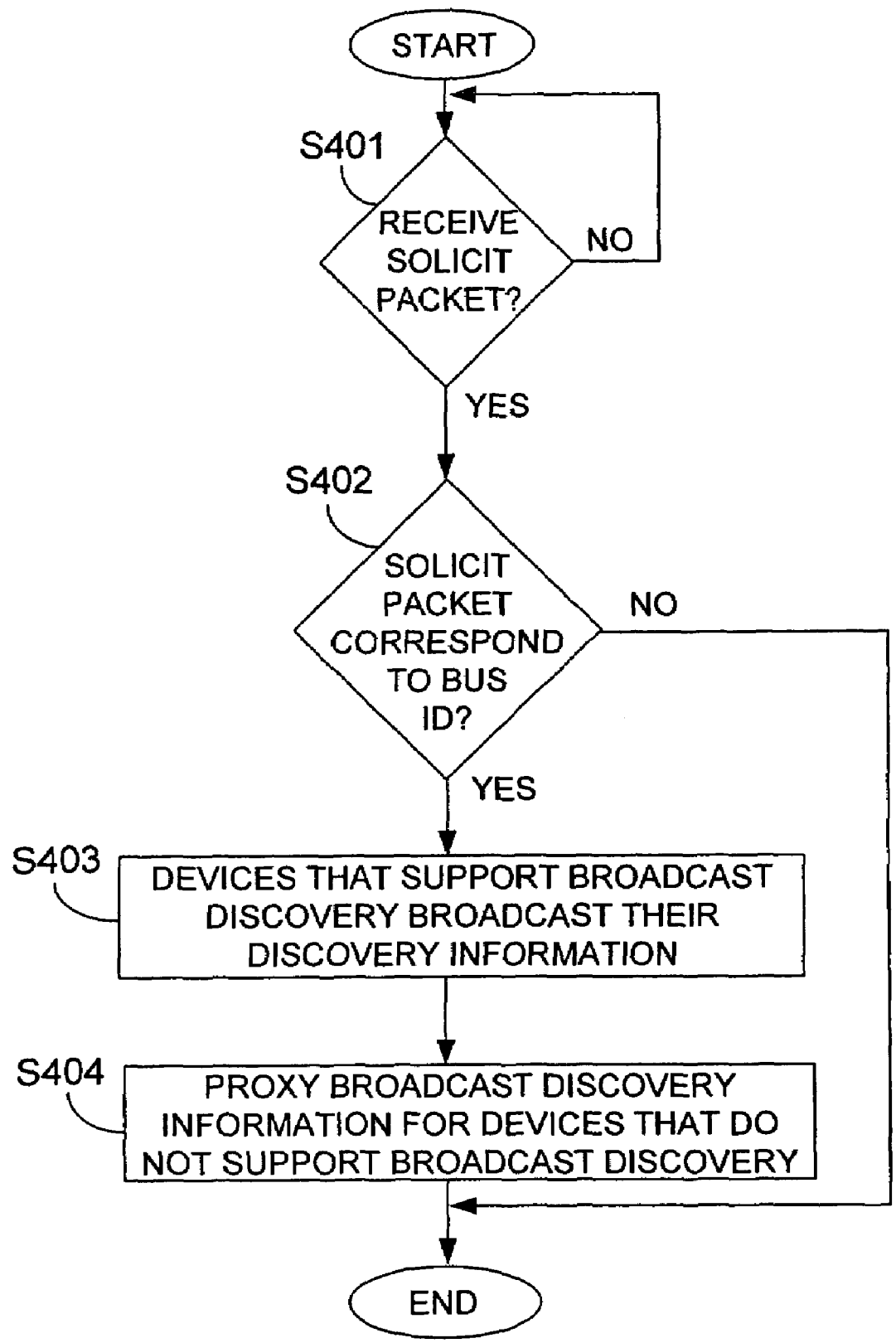

In step S304, proxy 39 broadcasts the discovery information received from device 36 to bus 25. Discovery device 32 reads that information and stores it in step S305. Proxy 39 also provides the information from its storage in response to subsequent requests by the discovery device. For example, as shown in FIG. 4, if a bus reset has not occurred, but a discovery device wants to update its current device information, the discovery device issues a solicit packet either globally to all devices on a network, to specific devices, or to devices on a particular bus. In, FIG. 5, for example, a solicit packet is issued by discovery device 40 on 1394 bus 41 for devices on bus 42. Devices on buses 41, 42 and 43 receive the solicit packet in step S401 and, in step S402, determine whether to respond based on whether the ID of their corresponding bus matches that in the packet. Here, only devices on bus 42 respond. For devices on other buses, the process ends.

Next, in step S403, bus 42 devices that support broadcast discovery (i.e., devices 45 and 46) broadcast advertise packets onto the BROADCAST CHANNEL of 1394 bus 42. These advertise packets are then routed, via bridge 44, to the BROADCAST CHANNEL of 1394 bus 41, from which they are read by discovery device 40. In response to the solicit packet, proxy 47 sends the discovery information that it has stored for device 49. (Device 49 is not configured to respond to the solicit packet with discovery information.)

Other embodiments are within the scope of the following claims. For example, the invention can be implemented on any bus that supports broadcast and "learn node ID then interrogate" or similar discovery. The order of the steps shown in FIGS. 3 and 4 may be changed. The invention is not limited to PCs on non-1394 bus 20, or to using PCs, VCRs and TVs on the 1394 buses. Rather, any types (and numbers) of devices may be used on any bus.

What is claimed is:

1. A network that uses a bus as a communication backbone, comprising:
   a first device that stores discovery information, the discovery information comprising operational control functions that are available on the first device via the bus,
   a second device configured to receive the discovery information via a broadcast; and
   a proxy configured to receive an identifier from the first device in response to an event on the bus, to query the first device for the discovery information using the identifier, and to broadcast the discovery information over the bus, thereby enabling the second device to receive the discovery information, wherein the identifier is independent of the discovery information;
wherein the identifier comprises a network identifier for the first device, and
wherein the proxy queries the first device by performing an asynchronous read transaction addressed based on the network identifier.

2. The network of claim 1, wherein the asynchronous read transaction is addressed to a storage location on the first device, the storage location containing data that identifies the operational control functions.

3. The network of claim 2, wherein the data also identifies a type of the device.

4. The network of claim 1, wherein the event comprises a bus reset that causes a hardware initialization of the first device, the hardware initialization triggering the first device to send the identifier to the proxy.

5. The network of claim 4, wherein the proxy queries the first device after the hardware initialization is completed.

6. The network of claim 1, wherein the second device is configured to solicit updates to the discovery information over the bus, the second device soliciting the updates by sending a solicit packet over the network; and
wherein the proxy is configured to respond to the solicit packet with discovery information.

7. The network of claim 6, wherein the solicit packets contain a first bus identifier, the proxy responding to the solicit packet only if the first bus identifier matches a second bus identifier stored on the proxy.

8. The network of claim 1, wherein the bus comprises an IEEE 1394 bus.

9. An apparatus comprising:
at least one processing device configured to execute instructions to enable communication over an IEEE-1394 bus between a first device configured to provide discovery information and a second device configured to receive the discovery information;
wherein the discovery information comprises operational control functions that are available on the first device via the IEEE-1394 bus;
wherein the first device is configured to provide the discovery information via learn-node-ID-then-interrogate protocol, and the second device is configured to receive the discovery information via broadcast-discovery protocol; and
wherein the at least one processing device is configured to execute instructions to:
receive a device identifier from the first device in accordance with the learn-node-ID-then-interrogate protocol;
perform an asynchronous read of the first device to obtain the discovery information in accordance with the learn-node-ID-then-interrogate protocol; and
broadcast the discovery information over the IEEE-1394 bus to the second device in accordance with the broadcast discovery protocol.

10. The apparatus of claim 9, wherein the first device is configured to provide the discovery information only via the learn-node-ID-then-interrogate protocol, and the second device is configured to receive the discovery information only via the broadcast-discovery protocol.

11. A method, performed by a proxy, of interfacing between a first device configured to provide discovery information over an IEEE1394 bus and a second device configured to receive the discovery information over the IEEE1394 bus, the discovery information comprising operational control functions that are available on the first device via the IEEE-1394 bus, the method comprising:
using a learn-node-ID-then-interrogate protocol to obtain the discovery information from the first device, wherein using the learn-node-ID-then-interrogate protocol comprises:
receiving a device identifier from the first device; and
performing an asynchronous read of the first device to obtain the discovery information; and
using a broadcast-discovery protocol to provide the discovery information to the second device, wherein using the broadcast-discovery protocol comprises:
broadcasting the discovery information over the IEEE1394 bus to the second device.

12. The method of claim 11, wherein the first device is configured to provide the discovery information only via the learn-node-ID-then-interrogate protocol, and the second device is configured to receive the discovery information only via the broadcast-discovery protocol.

13. The method of claim 11, wherein the proxy is configured to receive a solicitation and a bus identifier from the second device, and to respond to the solicitation with the discovery information only if the bus identifier matches a bus identifier associated with the IEEE1394 bus.

14. A method of interfacing between a first device and a second device that are configured to communicate over a bus, the method comprising:
receiving an identifier from the first device in response to an event on the bus, the first device storing discovery information, wherein the discovery information comprises operational control functions that are available on the first device via the bus, and wherein the identifier is independent of the discovery information;
querying the first device for the discovery information using the identifier; and
broadcasting the discovery information over the bus to the second device, wherein the second device is configured to receive the discovery information via broadcast;
wherein the identifier comprises a network identifier for the first device, and
wherein ciuerving comprises performing an asynchronous read transaction addressed based on the network identifier.

15. The network of claim 14, wherein the asynchronous read transaction is addressed to a storage location on the first device, the storage location containing data that identifies the operational control functions.

16. The network of claim 14, wherein the event comprises a bus reset that causes a hardware initialization of the first device, the hardware initialization triggering the first device to output the identifier onto the bus.

17. The network of claim 14, wherein querying is performed after the hardware initialization is completed.

18. The network of claim 14, wherein the second device is configured to solicit updates to the discovery information over the bus, the second device soliciting the updates by sending a solicit packet over the network; and
wherein the method further comprises responding to the solicit packet with discovery information.

* * * * *